(12) United States Patent
Lexer et al.

(10) Patent No.: US 9,225,218 B2
(45) Date of Patent: Dec. 29, 2015

(54) WINDING OVERHANG SUPPORT OF AN ELECTRICAL MACHINE

(75) Inventors: Alfred Lexer, Mordantsch (AT); Stefan Helmlinger, Weiz (AT)

(73) Assignee: Andritz Hydro GmbH, Wien (AT)

( * ) Notice: Subject to any disclaimer, the term of this patent is extended or adjusted under 35 U.S.C. 154(b) by 849 days.

(21) Appl. No.: 13/387,945

(22) PCT Filed: Jun. 25, 2010

(86) PCT No.: PCT/AT2010/000231
§ 371 (c)(1),
(2), (4) Date: Apr. 16, 2012

(87) PCT Pub. No.: WO2011/011801
PCT Pub. Date: Feb. 3, 2011

(65) Prior Publication Data
US 2012/0223608 A1    Sep. 6, 2012

(30) Foreign Application Priority Data

Jul. 29, 2009 (AT) ................................. A 1189/2009

(51) Int. Cl.
| | |
|---|---|
| *H02K 3/12* | (2006.01) |
| *H02K 3/24* | (2006.01) |
| *H02K 3/51* | (2006.01) |
| *H02K 3/52* | (2006.01) |

(52) U.S. Cl.
CPC .. *H02K 3/51* (2013.01); *H02K 3/12* (2013.01); *H02K 3/24* (2013.01); *H02K 3/527* (2013.01); *Y10T 29/49012* (2015.01)

(58) Field of Classification Search
CPC ........... H02K 3/12; H02K 3/24; H02K 3/527; H02K 3/51
USPC .............................. 310/270, 194, 43, 156.055
See application file for complete search history.

(56) References Cited

U.S. PATENT DOCUMENTS

| | | | |
|---|---|---|---|
| 4,387,317 A | 6/1983 | Alkire et al. | |
| 5,583,388 A * | 12/1996 | Paroz et al. | .................... 310/260 |
| 5,666,016 A * | 9/1997 | Cooper | ......................... 310/270 |
| 2007/0252473 A1* | 11/2007 | Taniyama et al. | ............. 310/270 |

FOREIGN PATENT DOCUMENTS

| | | |
|---|---|---|
| DE | 24 39 383 | 3/1976 |
| DE | 102007004449 | 10/2007 |

(Continued)

OTHER PUBLICATIONS

International Search Report completed Dec. 15, 2011.

*Primary Examiner* — Hanh Nguyen
*Assistant Examiner* — Leda Pham
(74) *Attorney, Agent, or Firm* — Nixon & Vanderhye P.C.

(57) ABSTRACT

The winding overhang of the rotor of an electrical machine is subject to strong centrifugal forces during operation, especially when the machines run at high speed. The winding overhang support prevents the production of relative movements between the winding overhang and the rotor base. These movements result in strong mechanical stresses on the winding bars. The winding overhang support includes an inner ring and an outer ring between which the winding bars are arranged in the region of the winding overhang, the outer ring being shrunk on the inner ring and both the outer ring and the inner ring being interspaced from the lamination stack.

16 Claims, 2 Drawing Sheets

(56) References Cited

FOREIGN PATENT DOCUMENTS

| | | |
|---|---|---|
| EP | 1 598 921 A2 | 11/2005 |
| JP | 53-146101 | 12/1978 |
| JP | 53-146191 | 12/1978 |
| JP | 63-28242 | 2/1988 |
| JP | 63-310342 | 12/1988 |
| JP | 02219430 A * | 9/1990 ............... H02K 3/51 |
| JP | H02-219430 | 9/1990 |
| JP | H04-331433 | 11/1992 |
| JP | H08-149736 | 6/1996 |
| SU | 1065970 | 1/1984 |

* cited by examiner

WINDING OVERHANG SUPPORT OF AN ELECTRICAL MACHINE

RELATED APPLICATION

This application is the U.S. national phase of International Application No. PCT/AT2010/000231 filed 25 Jun. 2010 which designated the U.S. and claims priority to Austrian Patent Application No. A 1189/2009 filed 29 Jul. 2009, the entire contents of each of these Applications are incorporated by reference.

BACKGROUND OF INVENTION

The present invention relates to an end winding support for a rotor in an electrical machine, where the rotor consists of a lamination stack in which winding bars are arranged, distributed around its circumference, with the winding bars extending beyond an axial end of the lamination stack in order to form the end winding, and also relates to a process for installing a rotor winding with an end winding of this kind.

If the rotors of electrical machines are designed with bar windings, they are also subject to high centrifugal forces, particularly at high speeds. The rotor windings of variable-speed machines, for example, are often designed as bar windings. In particular, the machines in variable-speed pumped storage power stations are operated at high speeds and their bar windings are therefore subject to high centripetal accelerations. In the region of the rotor base there are usually groups of two winding bars arranged on top of one another in axial slots, as is sufficiently well known, and these are held in radial direction against the centrifugal force by means of slot wedges. In order to achieve the necessary connection arrangement and the required interspacing between the winding bars, the winding bars must be slanted away from the axial direction in the region of the end winding, where the winding bars in the top and bottom layers slant in opposite directions so that they intersect. Due to the complicated arrangement and geometry of the winding bars in the end winding region, it is not possible to hold them in slots with wedges in the same way as in the rotor base region. The end windings are subject to stress from the prevailing centrifugal forces as a result, which means that radial support is required for the end windings.

Furthermore, the end windings and the winding bars, respectively, in the region of the end windings must be cooled, as is also sufficiently well known. As a rule, cooling is effected via a gaseous cooling medium that is directed over the end windings.

Various possibilities for supporting an end winding are known from the state of the art. So-called retaining rings are common, which are usually shrunk onto the rotor base and rest on the rotor base as a result. An example of this is found in GB 378 920 A, where an outer ring with teeth is pushed through the rotor slots onto the rotor base and is then turned so that the teeth come to rest between two slots, thus blocking the axial mobility of the outer ring. This outer ring supports the end winding in radial direction against the centrifugal forces. A similar arrangement is shown in GB 1 474 439 A, where two rings are shrunk on outside round the end winding, but again rest on the rotor base in radial direction. The problem with such arrangements, particularly in electrical machines in the heavy duty range, is that ventilation slots arranged between the partial lamination stacks to cool the rotor are closed off by the retaining ring shrunk onto the rotor base, which interferes with cooling of the rotor base in this region.

SUMMARY OF INVENTION

A task of the present invention is thus to provide an overhead winding support with which the above disadvantages are avoided and still guarantee sufficient radial support for the end winding and adequate cooling of the end winding.

According to an embodiment of the invention, this task may be achieved by the end winding support consisting of an outer ring and an inner ring in the region of the end winding, between which the winding bars are arranged in the region of the end winding, where the outer ring is shrunk on and forms a single unit with the inner ring and the winding bars in the region of the end winding, and where both the outer ring and the inner ring are interspaced from the lamination stack so that the single unit can move (expand) essentially freely in radial direction.

With this arrangement of two rings interspaced from the lamination stack, cooling of the lamination stack and of the winding bars in the lamination stack, respectively, is not affected.

If the dimensions and materials of the single unit formed by the outer ring, winding bars, and inner ring are selected suitably, the radial relative movements between the rotor base and the end winding can be kept low while at a standstill and in all operating modes, and very low bending and shearing stresses are generated at the winding bars.

If a spacer that is at least the same height as the winding bars, preferably slightly higher, is inserted in the region of the end winding in circumferential direction between two adjacent winding bars, this can ensure that no radial shrinkage forces are transferred to the winding bars.

Cooling of the end winding can be implemented very easily and effectively if the spacer is designed as a hollow profile. Cooling air can be directed through the hollow profiles in axial direction, thus effecting cooling of the end winding.

In a preferred embodiment, an insulation layer is arranged in radial direction between the inner ring and the winding bars and/or between outer ring and winding bars. It is also feasible to arrange the insulation layer between top bar and bottom bar. As a result, better electrical insulation is achieved between top and bottom bars.

The end winding support according to the invention can also be used if a bottom bar and a top bar are arranged on top of one another in radial direction, where a spacer that is at least the same height as the bottom bar and the top bar, respectively, preferably slightly higher, can be arranged in circumferential direction between two adjacent bottom bars and/or top bars.

Axial movement by the inner ring can be prevented very easily by providing a retaining device, for example retaining plates, in the region of the inner ring and which interacts with the inner ring and prevents axial movement by the inner ring and end winding, respectively, however without interfering with the radial movement of the end winding.

Similarly, retaining plates allow the end winding to be centered by engaging several radial slots on the inner surface of the inner ring.

It is useful if cooling air can be directed outwards axially in the region of the end winding between the winding bars and/or through the spacers as this guarantees improved cooling of the end winding.

The invention also relates to a process for installing a rotor winding with an end winding support, where the process comprises the following steps:

a) an inner ring is arranged with interspacing to the lamination stack of the rotor base.
b) winding bars are inserted into the lamination stack, distributed around the circumference, and which extend over an axial end of the lamination stack to form an end winding, and
c) an outer ring is shrunk onto winding bars and the inner ring in the region of the end winding with interspacing to the lamination stack, where a single unit is formed comprising the outer ring, the winding bars in the region of the end winding, and the inner ring, and where the single unit remains essentially freely movable in radial direction.

As a result, the end winding is supported in radial direction by the reciprocal stress and is protected in operation against the mechanical loads generated by the centrifugal forces arising.

In an advantageous embodiment, a spacer that is preferably higher than the winding bars is arranged in the region of the end winding between two winding bars adjacent to one another in circumferential direction before shrinking the outer ring on.

As a result, no radial shrinking forces are transferred to the winding bars.

The winding bars and the spacers can also be arranged in two layers in the process according to the invention.

SUMMARY OF DRAWINGS

The present invention is described on the basis of the diagram examples and non-restrictive FIGS. 1 to 3. Here.

DETAILED DESCRIPTION OF INVENTION

Figure 1:
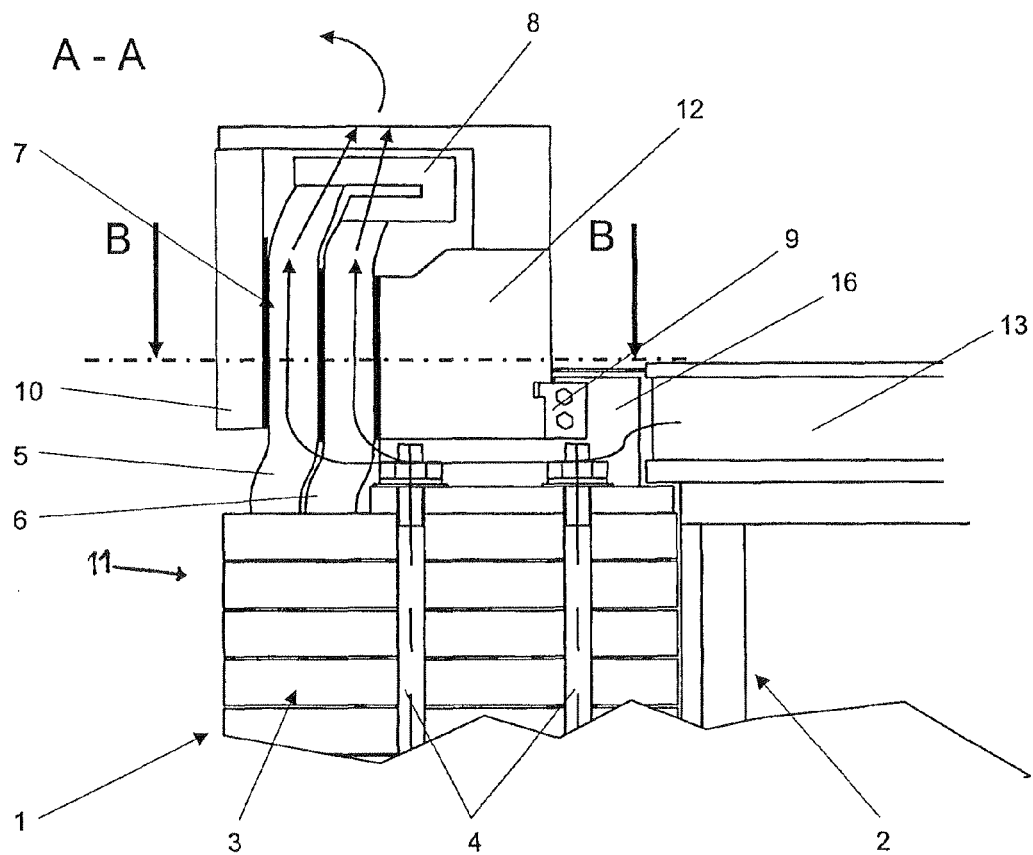
FIG. 1 shows a longitudinal section through a rotor of an electrical machine.
Figure 3:
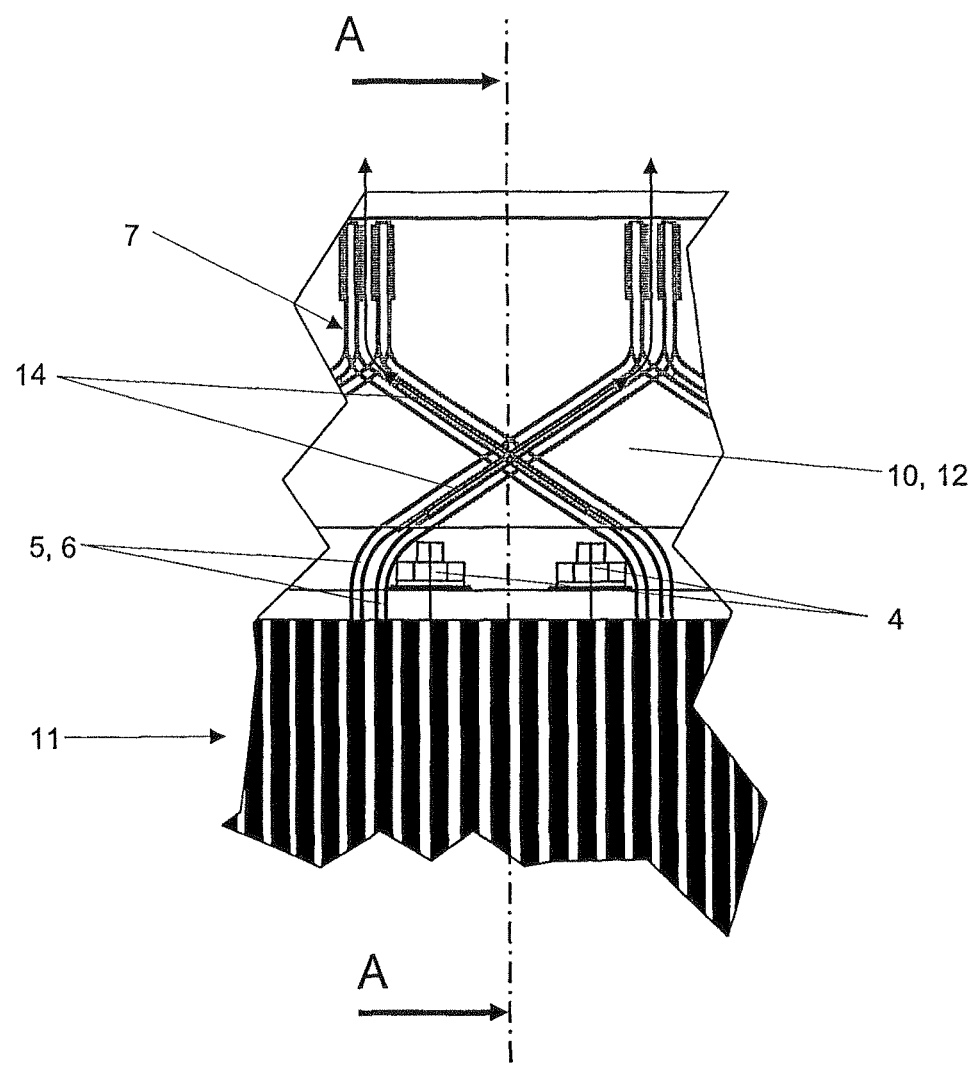
FIG. 3 shows a view in radial direction of the end winding of a rotor.

The rotor 1 of an electrical machine, such as a hydrogenerator, illustrated in FIG. 1 comprises a rotor spider 2 upon which the lamination stack 3 of the rotor 1 is mounted in a way that is already known. The lamination stack 3 is held together here by sufficiently well known pressing bolts 4. The rotor spider 2 and lamination stack 3 thus form the rotor base 11 of the rotor 1. In the radial outer region of the lamination stack 3, slots are arranged which are not shown here and in which the insulated winding bars, here a top bar 5 and a bottom bar 6, are inserted and held in radial direction by slot wedges. An arrangement of this kind is sufficiently well known, which is why it is not described here in more detail. The winding bars 5, 6 protrude from the lamination stack 3 in axial direction on both sides and form the so-called end winding 7 outside the lamination stack 3. As is sufficiently well known, the winding bars 5, 6 are arranged on a slant in relation to the axial direction in the area of the end winding 7, where the top bar 5 and the bottom bar 6 slant in opposite directions so that they intersect, as shown schematically in FIG. 3. In order to form windings, the top bars 5 and the bottom bars 6 are connected to one another by bar connectors 8, preferably at their axial ends.

The winding bars 5, 6 are arranged in the region of the end winding 7 between an inner ring 12 and an outer ring 10 and form a single unit 30 together with them. Both rings 10, 12 are interspaced from the rotor base 11 and from the lamination stack 3, respectively, preferably axially interspaced, and they do not touch it and are not connected to it, respectively. Thus both rings 10, 12 do not rest on the rotor base 11 and the lamination stack 3, respectively, or elsewhere, at least not in radial direction, but can open out unhindered in radial direction. The retaining device 9, e.g. a retaining plate, which is secured to a retaining bracket 16, is used essentially to prevent axial displacement of the end winding 7 with the rings 10,12 and to center the inner ring 12. However this retaining device 9 does not hinder essentially free opening out of the unit in radial direction. The retaining device 9 could be designed as a metal plate with a projection (as indicated in Fig. I), where the projection engages a slot at the inner ring 12 in axial direction with positive fit, but the plate is arranged with radial interspacing towards the inner ring 12 and thus, the radial movement is not restricted.

The outer ring 10 is shrunk onto the end winding 7 and forms a single unit with the inner ring 12 due to reciprocal stress. In order to prevent the forces from acting on the winding bars 5, 6, which could breach the insulation of the winding bars 5, 6 for example, spacers 14 that are at least the same height as the winding bars 5, 6, but preferably slightly higher—at least so much higher that no shrinking forces can be transferred to the winding bars 5, 6 (e.g. between 0.5 and 1 mm higher than the winding bars 5, 6), can be arranged between the winding bars 5, 6 (viewed in circumferential direction). This is shown in a diagrammatic form and strongly exaggerated in FIG. 1. Similar to the winding bars 5, 6, the spacers 14 are arranged slanting in opposite directions and intersect (see above). This causes the shrinkage forces to be conducted from the outer ring 10 via the spacers 14 to the inner ring (essentially via the intersecting points of the spacers 14,) and the winding bars 5, 6 remain essentially free of shrinkage forces in radial direction and can even move in radial direction within certain limits. As a result, a single unit is formed by the outer ring 10, the spacers 14 and the inner ring 12, where the winding bars 5, 6 are embedded into this unit and remain essentially free of forces. If the materials forming these parts are now selected suitably according to their modulus of elasticity, the geometries and/or the shrinkage temperatures, the winding bars 5, 6 experience approximately the same extent of radial displacement as in the region of the rotor base 11 as a result of the centrifugal forces acting on the end winding in the region of the end winding, with the result that the winding bars 5, 6 only suffer minimal mechanical stress. In this way, the radial relative movements between rotor base and end winding 7 can be kept low in all operating modes so that no bending or shearing stresses are generated on the winding bars 5, 6 as far as possible. Of course, it is not necessary to arrange spacers 14 between all of the winding bars 5, 6, but gaps can be provided through which the cooling air, for example, can be directed.

Figure 2:
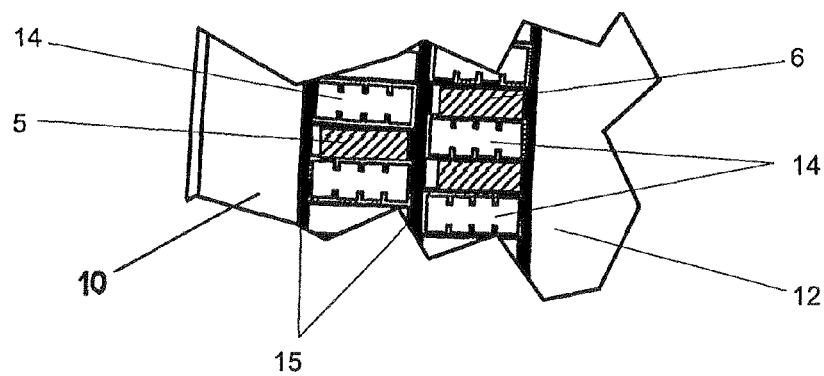
FIG. 2 shows a cross-section through the end winding of a rotor.

If the spacers 14 are designed as hollow profiles, as indicated in FIG. 2, they can also be used to carry cooling air. In a preferred embodiment, this hollow profile is designed with ribs aligned in longitudinal direction, that is to say parallel to the winding bars. In addition, a radial fan 13 (shown in FIG. 1) is provided on the inside in radial direction in relation to the end winding 7 and sucks in cold cooling air, e.g. from a heat exchanger not shown, and blows it out in radial direction to the end winding 7. There the cooling air is deflected away from the radial direction into an axial direction, e.g. by suitable baffle plates, and flows axially through the channels in the hollow profiles of the spacers 14 to the outside, which causes cooling of the end winding. This cooling air cycle is indicated by the arrows in FIG. 1 and FIG. 3.

Similarly, it is possible to arrange insulation layers 15, e.g. made of a hard-fiber fabric, between top bar 5 and bottom bar 6 and/or between top bar 5 and outer ring 10 and/or bottom bars 6 and inner ring 12, in order to achieve better electrical insulation of the top and bottom bars 5, 6. These insulation layers 15 are then, of course, also part of the single unit.

Installation of an end winding support could proceed as follows: First of all, the inner ring 12 is arranged in the region of the end winding 7 and then the bottom bars 6 are placed in the slots and secured. After this, the spacers 14 are inserted between the bottom bars 6 in the end winding region. Then an insulation layer 15 can be arranged around the spacers. Afterwards the slots can also be closed with the slot wedges. When the top bars 5 have been inserted, spacers 14 can be arranged again in between in the end winding region. At this stage of installation, switching connections, bar connectors 8 and insulation rings can also be mounted. If necessary, a further insulation layer 15 can now be arranged around the top bars 5 and round the spacers 14, respectively. After this, the outer ring 10, which has been heated to a certain temperature, for example 160° or 200° C., is placed over the top and cooled down. As a result, the outer ring 10 shrinks, also shrinking onto the inner ring 12 (via the spacers 14), which causes the single unit to be formed. In this way the end winding 7 is supported in radial direction by the reciprocal stress and protected against mechanical loads in operation, which are caused by the centrifugal forces occurring.

The single unit formed by the inner ring 12, winding bars 5, 6, spacers 14, and any insulation layers 15 required can be designed in such a way that the radial relative movements of the rotor base 11 and the end winding 7 remain slight in all operating modes and do not cause any bending or shearing stresses on the winding bars 5, 6 as far as possible.

The invention claimed is:

1. An end winding support for a rotor in an electrical machine, where the rotor includes a lamination stack in which winding bars are distributed around the circumference of the stack, and end windings of the winding bars extend beyond an axial end of the lamination stack, the end winding support comprising:
   an outer ring and an inner ring, wherein the end windings are arranged between the outer ring and the inner ring along a direction parallel to a rotational axis of the rotor;
   a shrink fitted joint between the outer ring and the end winding, and
   an assembly formed by the outer ring, the end windings and the inner ring, wherein the assembly is attached to the motor,
   wherein both the outer ring and the inner ring are spaced from the lamination stack so that the assembly can move in a radial direction with respect to the stack.

2. The end winding according to claim 1 further comprising a spacer having a height in cross section at least as high as the height in cross section of each of the winding bars and the spacer is between two of the winding bars that are adjacent each other in a circumferential direction.

3. The end winding support according to claim 2, wherein the spacer includes a hollow profile.

4. The end winding support according to claim 1 further comprising an insulation layer arranged in radial direction between the inner ring and at least one of the winding bars.

5. The end winding support according to claim 1 further comprising an insulation layer arranged in radial direction between the outer ring and at least one of the winding bars.

6. The end winding support according to claims 1 wherein the winding bars include a bottom bar and a top bar, and a spacer between the bottom bar and top bar at the end winding portion of the bars, wherein the spacer has a height in cross section at least as high as the height in cross section of the bottom bar or the top bar at the end windings portion.

7. The end winding support according to claim 6 further comprising an insulation layer between the bottom bar and top bar.

8. The end winding support according to claim 1 further comprising a retaining device abutting the inner ring and engaging the inner ring to suppress axial movement of the end winding.

9. The end winding support according to claim 1 further comprising a hollow spacer between two of the end windings adjacent each other, wherein a cooling passage extends through the spacer.

10. A method to install an end winding support on a rotor including slots are distributed in an annular array around the circumference of a lamination stack and the slots extend parallel to a rotational axis of the lamination stack, wherein the method comprises:
    inserting winding bars into the slots of the lamination stack, wherein end windings of the winding bars extend axially from an axial end of each of the slots;
    mounting an inner ring onto the lamination stack after inserting the winding bars, and
    shrink fitting an outer ring onto the end windings, wherein the outer ring, end windings and inner ring form an assembly attached to the rotor in which the end windings are between the outer ring and the inner ring along a direction parallel to a rotational axis of the rotor, and the assembly moves in a radial direction with respect to the lamination stack.

11. The method according to claim 10 further comprising arranging a spacer between two of the end windings adjacent each other.

12. The method according to claim 10 inserting an insulation layer between at least one of the inner ring and the end windings, between the end windings, and between the end windings and the outer ring.

13. The method according to claim 10 wherein the insertion of the winding bars includes inserting a first layer of winding bars in the slots and a second layer in the slots before the step of shrinking the outer ring on the end windings.

14. The method according to claim 11 wherein the insertion of the spacer between the end windings is performed before the step of shrinking the outer ring on the end windings.

15. The method of claim 13 further comprising inserting an insulation layer into the slots after inserting the first layer and before inserting the second layer, such that the insulation layer is sandwiched between the first layer and the second layer.

16. The method according to claim 10 further comprising attaching a retaining device to the inner ring and the lamination stack, wherein the retaining device suppresses axial displacement of the end windings.

* * * * *